(12) United States Patent
Almy et al.

(10) Patent No.: US 11,264,942 B2
(45) Date of Patent: Mar. 1, 2022

(54) ACTUATOR DRIVEN SINGLE-AXIS TRACKERS

(71) Applicant: Ojjo, Inc., San Rafael, CA (US)

(72) Inventors: Charles Almy, Berkeley, CA (US); Jack West, San Rafael, CA (US)

(73) Assignee: Ojjo, Inc., San Rafael, CA (US)

( * ) Notice: Subject to any disclaimer, the term of this patent is extended or adjusted under 35 U.S.C. 154(b) by 0 days.

(21) Appl. No.: 16/540,587

(22) Filed: Aug. 14, 2019

(65) Prior Publication Data
US 2019/0372514 A1  Dec. 5, 2019

Related U.S. Application Data

(63) Continuation of application No. 15/968,595, filed on May 1, 2018, now Pat. No. 10,422,098.

(60) Provisional application No. 62/492,802, filed on May 1, 2017.

(51) Int. Cl.
| | |
|---|---|
| *H02S 20/32* | (2014.01) |
| *H02S 30/10* | (2014.01) |
| *H02S 20/30* | (2014.01) |
| *F16M 11/10* | (2006.01) |

(52) U.S. Cl.
CPC ............. *H02S 20/32* (2014.12); *H02S 20/30* (2014.12); *H02S 30/10* (2014.12); *F16M 11/10* (2013.01)

(58) Field of Classification Search
CPC .................................. H02S 20/30; H02S 20/32
See application file for complete search history.

(56) References Cited

U.S. PATENT DOCUMENTS

| | | | | |
|---|---|---|---|---|
| 5,228,924 | A * | 7/1993 | Barker | F24S 30/425 136/246 |
| 2013/0048582 | A1 * | 2/2013 | Kruse | F24S 30/425 211/41.1 |
| 2014/0374550 | A1 * | 12/2014 | Straeter | F24S 30/425 248/156 |
| 2016/0013751 | A1 * | 1/2016 | Michotte De Welle | H02S 20/32 136/246 |

* cited by examiner

*Primary Examiner* — Lindsey A Bernier
(74) *Attorney, Agent, or Firm* — Phillip D. Mancini

(57) ABSTRACT

A single-axis solar tracker consisting of a series of A-frame shaped foundation with actuators attached to each leg that are connected at one end to a common rotating assembly supporting multiple solar panels. Concerted action of the actuators causes the common rotating assembly to rotate about an axis of rotation. The system may include a central torque tube supported by the series of A-frame foundations or a frame assembly that is hingedly attached to each A-frame foundation via a torque arm.

5 Claims, 8 Drawing Sheets

ACTUATOR DRIVEN SINGLE-AXIS TRACKERS

CROSS-REFERENCE TO RELATED APPLICATIONS

This continuation-in-part claims priority to U.S. Utility patent application Ser. No. 15/968,595, titled "Guided Multiple Pile System," filed on May 1, 2018, and U.S. Provisional Patent Application No. 62/492,802, entitled Worm Gear Pile Apparatus and Method, filed May 1, 2017, the entire disclosures of which are hereby incorporated by reference in their entirety.

BACKGROUND

Solar energy is one of Earth's largest potential sources of energy. Above the atmosphere, solar irradiance per unit area is 1.361 kilowatts per square meter. At sea level, the usable energy density is reduced to 250 watts per square meter. Using a two-dimensional model to approximate the Earth, 250 watts/square meter*$\pi$*6,371,000 meters$^2$ yields about 32,000 terra (trillion) watts of energy that continuously strikes Earth's surface. Assuming the sun continues to burn and emit photons for a billion more years, the survival of human life ultimately depends on harnessing this essentially unlimited, source of clean energy.

The main impediment to widescale solar adoption thus far has been cost. Unlike other energy sources, solar energy costs are frontloaded while the operating costs are comparatively low. Fossil fuel-based energy sources require up-front costs as well as pay-as-you-go costs from consuming fuel. Unfortunately, not all the ongoing costs are reflected in the price of energy generated from fossil-fuel sources. These "dirty" energy sources have significant external costs stemming from $CO_2$ emissions that, in the absence of a carbon tax, are not reflected in the cost. In addition, entrenched utilities and fossil fuel producers have lobbied effectively to stymie the progress of solar, even in states with the greatest solar potential.

Notwithstanding these headwinds, the cost of solar has now dropped low enough that even when coupled with energy storage, it is equivalent to or less expensive than coal, oil and even natural gas. In the context of the electricity market, the relative cost difference between competing sources is quantified in terms of the cost per unit, typically a kilowatt hour (kWh). Large scale solar arrays, so called "utility-scale" arrays, may have tens to hundreds of megawatts of power generating capacity, putting them on the same scale as small coal and natural gas-fueled power plants. These arrays usually generate power that is fed into the grid and sold at wholesale prices on the order of a few cents per kWh. The development of utility-scale solar projects is funded with so-called power purchase agreements (PPAs). With a PPA, an off-taker (e.g., utility, grid operator, etc.) agrees to purchase all the power generated by the system at a fixed rate for the operational life of the array (e.g., 30 years). This enables a bank or other investors to accurately value the predicted future stream and to loan money against it to finance construction of the array.

Utility-scale solar power plants are predominantly configured as fixed-tilt ground mounted arrays or single-axis trackers. Fixed-tilt arrays are arranged in East-West oriented rows of panels tilted South at an angle dictated by the latitude of the array site—the further away from the equator, the steeper the tilt angle. By contrast, single-axis trackers are installed in North-South rows with the solar panels attached to a rotating axis called a torque tube that move the panels from an East-facing orientation to a West-facing orientation throughout the course of each day, following the sun's progression through the sky. For purposes of this disclosure, both fixed-tilt and single-axis trackers are referred to collectively as axial solar arrays.

Excluding land acquisitions costs, overall project costs for utility-scale arrays may include site preparation (road building, leveling, grid and water connections etc.), foundations, tracker or fixed-tilt hardware, solar panels, inverters and electrical connections (conduit, wiring, trenching, grid interface, etc.). Many of these costs have come down over the past few years due to ongoing innovation and economies of scale, however, one area that has been largely ignored is foundations. Foundations provide a uniform structural interface that couples the system to the ground. When installing a conventional single-axis tracker, after the site has been prepared, plumb monopiles are usually driven into the ground at regular intervals dictated by the tracker manufacturer and site plan; the tracker system components are subsequently attached to the head of those piles. Most often, the piles used to support the tracker have an H-shaped profile, but they may also be C-shaped or even box-shaped. In conventional, large-scale single-axis tracker arrays, the procurement and construction of the foundations may represent up to 5-10 percent of the total system cost. Despite this relatively small share of the total cost, any savings in steel and labor associated with foundations will amount to a significant amount of money over a large portfolio of solar projects. Also, tracker development deals are often locked-in a year or more before the installation costs are incurred, so any post-deal foundation savings that can be realized will be on top of the profits already factored in to calculations that supported the construction of the project.

One reason monopiles continue to dominate the market for single-axis tracker foundations is simplicity. It is relatively easy to drive plumb piles into the ground with existing technology even if the design is inherently wasteful. The physics of a monopile mandates that it be oversized because single structural members are not good at resisting bending forces. When used to support a single-axis tracker, the largest forces on the foundation are not from the weight of the components, but rather the combined lateral force of wind striking the solar panels. This lateral force gets translated into a monopile foundation as a bending moment. The magnitude of this force is much greater than the static loading attributable to weight; it acts like a lever arm trying to bend the pile, and the longer the lever arm, the greater the magnitude of the force. Most tracker companies specify a minimum foundation height of 40-inches or more to provide sufficient clearance for the panels, therefore, in the context of single-axis trackers, monopile foundations must be oversized and driven deeply into the ground to withstand these lateral loads.

The applicant and inventors of this invention have developed an A-frame-shaped foundation system that provides several advantages over conventional monopiles. The system is marketed and sold commercially as Earth Truss™. Unlike conventional monopiles, A-frames are capable of translating lateral loads into axial forces of tension and compression in the legs of the A-frame. Individual structural members are relatively good at resisting such forces relative to their ability to resist bending; therefore, less steel may be used to support the same worst-case loads. Also, because axial forces dominate, the legs do not need to be driven as deeply as monopiles typically are. Not only does this reduce the linear feet of steel required, but it also eliminates some subsurface risk. When using a pile driver to beat in H-piles, a certain portion of the time, the pile will hit rocks, bed rock or cementious soils that prevent further penetration. This event, known in the industry as a refusal, triggers a time consuming and costly mitigation process that involves removal of the original pile, drilling through the obstruction, setting a new pile in the drilled cavity, and filling it with cement or grout. By driving to shallower depths, a percentage of subsurface risk is eliminated because harder soils and bedrock tend to be located more deeply. All of these factors provide a strong value proposition for A-frame-shaped truss foundations relative to plumb-piles.

The EARTH TRUSS system consists of a pair of adjacent truss legs driven partially into the ground that are joined with an adapter, bearing adapter or other apex hardware to form a unitary A-frame support structure. Third-party tracker hardware such as bearing assemblies, torque tubes, motors, dampers, etc. are then attached to this foundation. Because monopiles have dominated the foundation market for single-axis trackers, most, if not all tracker companies have been forced to design their systems to mate with a standard W6×9 or W6×12 beam having a six-inch web to take advantage of the standard foundation interference. However, this constraint may require redundant or unnecessary structural components to interface proprietary tracker systems to generic H-pile foundations that could be eliminated if the system was optimized for an A-frame foundation. To that end, it is an object of various embodiments of the invention to provide single-axis trackers and foundation systems for single-axis trackers that have been optimized to take advantage of A-frame geometry provided by the EARTH TRUSS foundation system.

SUMMARY OF THE INVENTION

In light of the foregoing, various embodiments of the invention may provide a tracker system that has a plurality of solar panels arranged in at least one row, a plurality of A-frame foundations supporting the tracker system and panels where each A-frame foundation consist of a pair of adjacent legs extending above and below ground, and linear actuators attached to each adjacent leg that are operable to selectively extend and retract in substantial unity causing the plurality of solar panels to change orientation about a North-South axis.

Other embodiments of the invention may provide a tracker system having a plurality of solar panels arranged in at least one row, a plurality of A-frame foundations supporting the plurality of solar panels, each A-frame foundation made of a pair of adjacent legs extending above and below ground, and linear actuators attached at one end to each leg that are operable to selectively extend and retract in substantial unity to cause the plurality of solar panels to change their orientation.

Still further embodiments of the invention may provide a drive system for a single-axis solar tracker that consists of an A-frame-shaped foundation formed from a pair of adjacent legs, a common rotating support structure for supporting solar panels at a common orientation with respect to the foundation, and a pair of linear actuators attached at a first end to respective ones of the legs and at a second end to opposing end portions of a torque arm so that concerted actuation of the actuators causes the plurality of solar panels to rotate in substantial unity via the common rotating support structure.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure but rather, are intended to be exemplary only.

DETAILED DESCRIPTION

The following description is intended to convey a thorough understanding of the embodiments described by providing a number of specific embodiments and details involving single-axis trackers supported by A-frame foundations. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1:
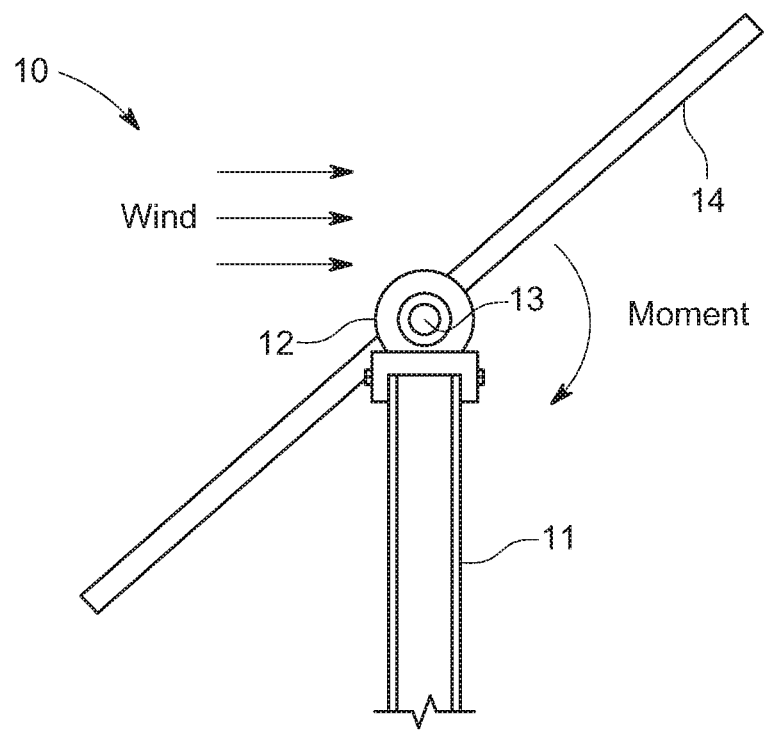
FIG. 1 is an end view of a portion of a conventional single-axis tracker and foundation.

FIG. 1 is an end view of a portion of a conventional single-axis tracker. Tracker system 10 consists of torque tube 13 captured within bearing assembly 13 that is supported by monopile foundation 11. Solar panels 14 are attached to the torque tube via brackets (not shown). Torque tube 13, as well as monopile 11, are oriented along a North-South axis so that as tube 13 rotates within bearing 12, panels 14 remain on-sun while the sun moves from East to West each day. In a complete system, each row will consist of multiple monopiles and interconnected sections of torque tube that are in turn connected to one or more drive mechanisms. Bearing assembly 12 is shown as spanning over the flanges of H-pile 11. It is also possible that the assembly will be attached to holes formed in the web portion, depending on manufacturer.

In such a tracker, wind striking the panels making up the array imparts a lateral load that is translated to the foundation at the point where that load is resisted. The magnitude of the load is proportional to the angle of the panels with respect to the direction of the load; it is greatest when the panels are rotated to their steepest angle (i.e., at the beginning and end of each day). If the tracker is supported by monopile foundations, as shown in FIG. 1, the lateral load will impart a bending moment that must be resisted by monopile 11. Because single structural members are relatively poor at resisting such loads, the monopile must be oversized and driven more deeply relatively to the capacity required to support weight alone. If torque tube 13 is free to spin within bearing assembly 12, that is bearing assembly 12 does not have a lock or stop in it that resists rotation, most of the moment will be resisted at the pile supporting the motor because the motor acts as the rotational brake for the entire tube.

Figure 2A:
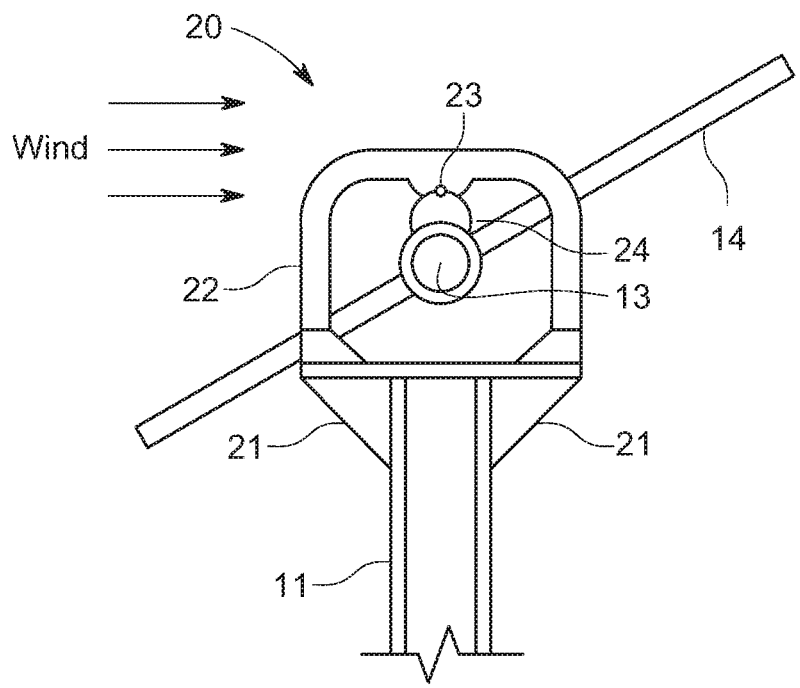
FIG. 2A is an end view of another conventional single-axis tracker and foundation.
Figure 2B:
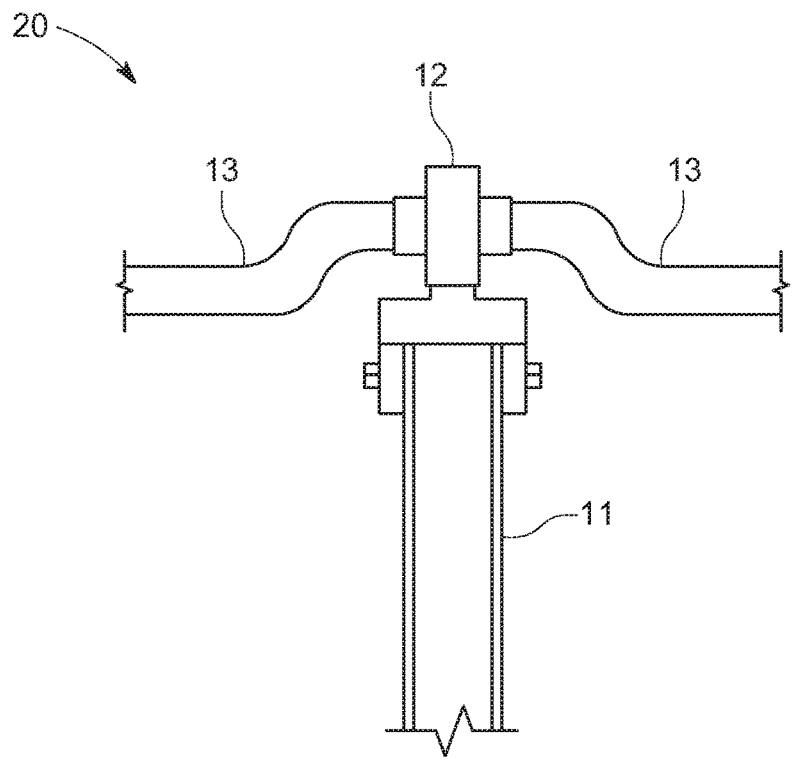
FIG. 2B is a side view of a drive motor and foundation for the single-axis tracker shown in 2A.
Figure 2C:
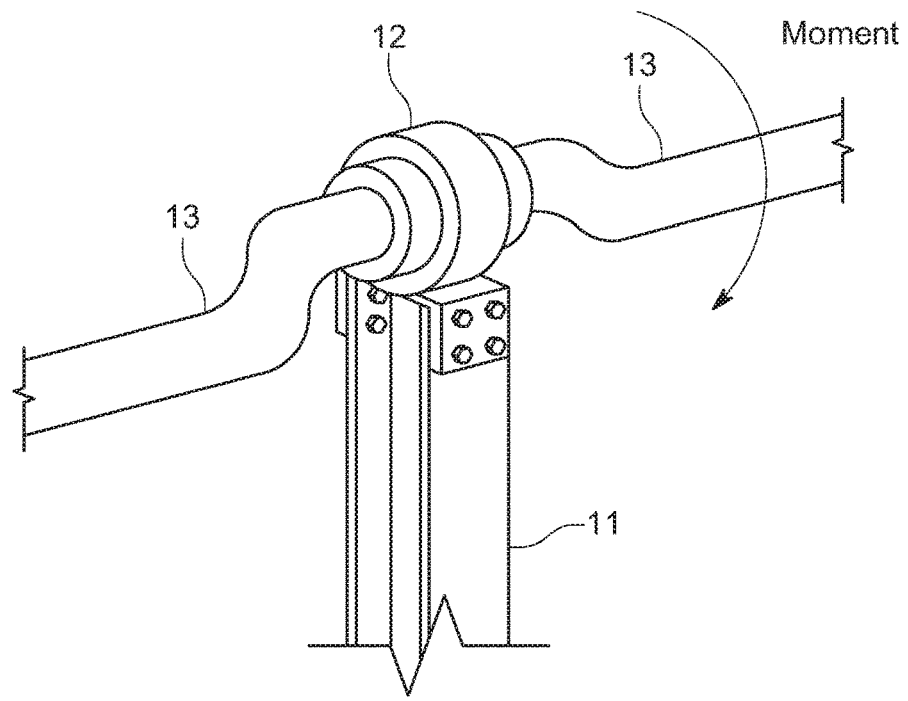
FIG. 2C is a perspective view of the structure shown in 2B.

FIGS. 2A-C show various views of another type of single-axis tracker supported by monopile foundations. Starting with the end view of 2A, in tracker system 20, torque tube 13 is suspended from a bearing pin 23 seated in a bearing formed in U-shaped support 22 via hanger bracket 24. Support 22 sits on a pair of right-angle brackets 21 that are attached to opposing flanges of monopile 11. Right-angle brackets 21 widen the mounting platform for U-shaped support 22 so that torque tube 13 has sufficient clearance to swing about bearing pin 23. Instead of rotating about its own axis, as with system 10 shown in FIG. 1, torque tube 13 in FIGS. 2A-C swings like a pendulum about bearing pin 23. FIG. 2B shows motor assembly 12 used in such a tracker system. As seen in the figure, as torque tube sections 13 approach motor assembly 12, they curve upward so that the offset motor rotates the tube in place but at each bearing pile (i.e., the structure in 2A), the tube swings through an arc rather than rotating in place. U-shaped support 22 will limit the extent of the arc that the torque tube can travel, but until it reaches that point support 22 does not prevent torque tube 13 from swinging in response to lateral loads. Therefore, in most cases most of the moment will be taken up by the motor pile as seen in 2C, however, when the panels are at or near maximum inclination, moment may be distributed to each foundation along the torque tube.

Figure 3A:
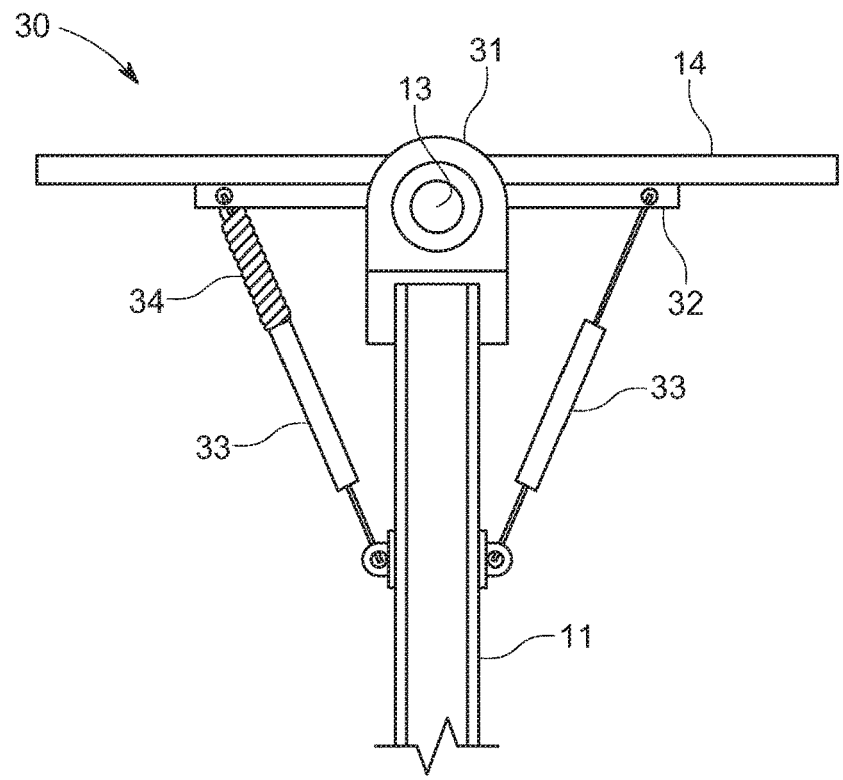
FIG. 3A is an end view of a portion of another conventional single-axis tracker and foundation with solar panels a first orientation.
Figure 3B:
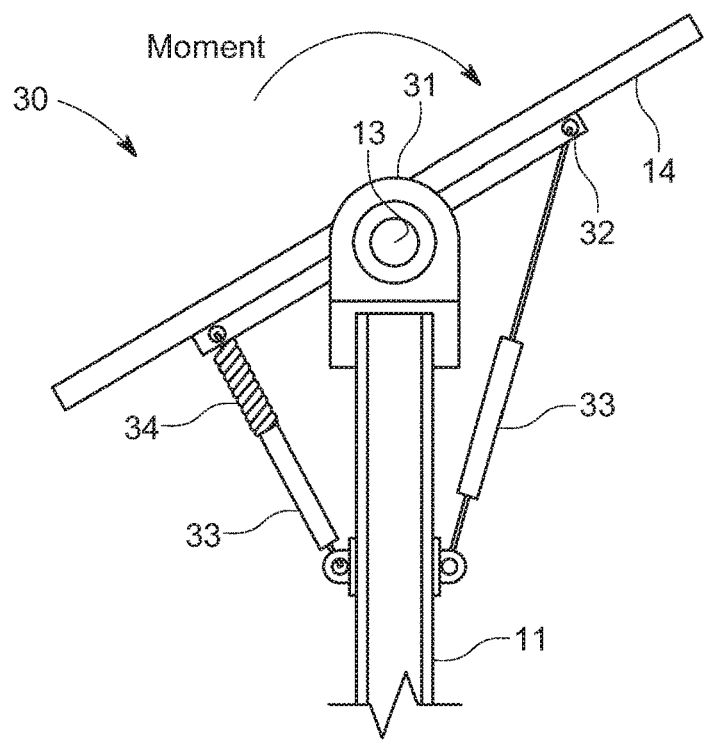
FIG. 3B shows the single-axis tracker of 3A with solar panels at a second orientation.

FIGS. 3A and 3B show yet another single-axis tracker 30. Instead of relying on a central motor geared directly to the torque tube, in tracker 30 actuators are used to indirectly move the torque tube. As discussed in greater detail below, this design may have some benefits relative to the centrally powered trackers shown in FIGS. 1 and 2A-C. Tracker 30 shown here also relies on monopile foundations 11 that each support a bearing assembly 31 and torque tube 13. Torque arm 32 extends away from both sides of torque tube 13 (e.g., East-West directions) proximate to bearing assembly 31. Torque arm 32 is coupled to torque tube 13 so that application of forces to either end of the arm causes the tube and attached panels to rotate. Actuators 33 are attached to opposing flanges of multiple ones or all of the monopile foundations, extending at their upper end to respective end portions of torque arm 32. As shown, actuators 33 are linear actuators with connection points at either end. In this exemplary system, actuators 33 are pinned to H-pile 11 and torque arm 32, enabling them to pivot in-plane as they extend and contract. Alternatively, actuators 33 may be pinned to the H-pile but received in a slot in torque arm 32, enabling them to slide within the slot as the actuator is selectively extended or retracted. Also, a rubber boot such as dust boot 34 may be used to protect the portion of each actuator that enters and exits the cylinder. Because actuators 33 engage torque tube 13 indirectly via torque arm 32, they have a mechanical advantage relative to torque-tube centered motors, enabling low power motors to be used relative to the central motors typically used to rotate a long torque tube, such as in the systems shown in FIGS. 1A and 2A-C. Also, as discussed above, moments are greatest at the foundations that are supporting the motor because the motor acts as the rotational brake imparting a moment on the supporting foundation. By distributing motors along the torque tube, the moments are also distributed and reduced at each monopile to a more manageable size, however, they may be greater at each monopile than they are at monopiles supporting the bearing assembly of a conventional tracker. Also, loads and moments are translated into the foundation at a lower point along monopile 11, creating a shorter moment arm and allowing the pile to be embedded less deeply than an equivalent tracker where loads and moments are translated at the top of the pile.

In FIG. 3A, panels 14 are at a substantially horizontal orientation. Although this orientation should minimize loads attributable to wind, it may maximize loads due to snow loading. Snow loads may impart forces to one both actuators 33 that are ultimate translated into monopile 11. FIG. 3B shows system 30 of 3A at a second orientation where panels 14 are tilted towards the horizon. As the angle of panels 14 increases with respect to horizontal, lateral loading due to wind will also increase. In the case of 3A or 3B, actuators 33 will experience axial forces trying to compress or extend the cylinder. This will in turn impart a moment on the monopile foundation that is proportional to the angle of the actuator with respect to the pile. The less in-line the force is with respect to the axis of the monopile, the greater will be the magnitude of the moment.

Figure 4A:
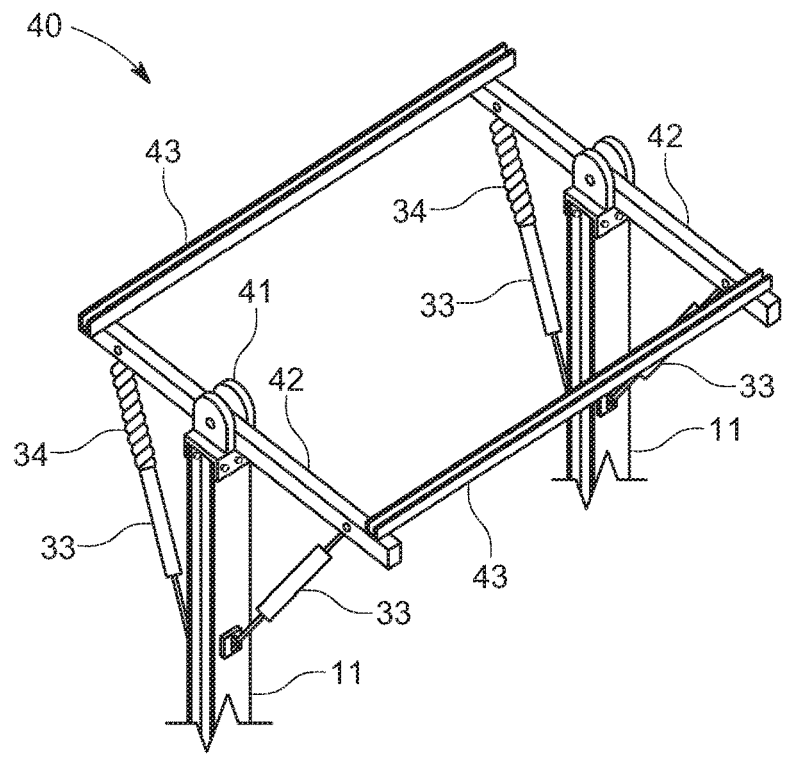
FIG. 4A is perspective view of a portion of another conventional single-axis tracker and foundation.
Figure 4B:
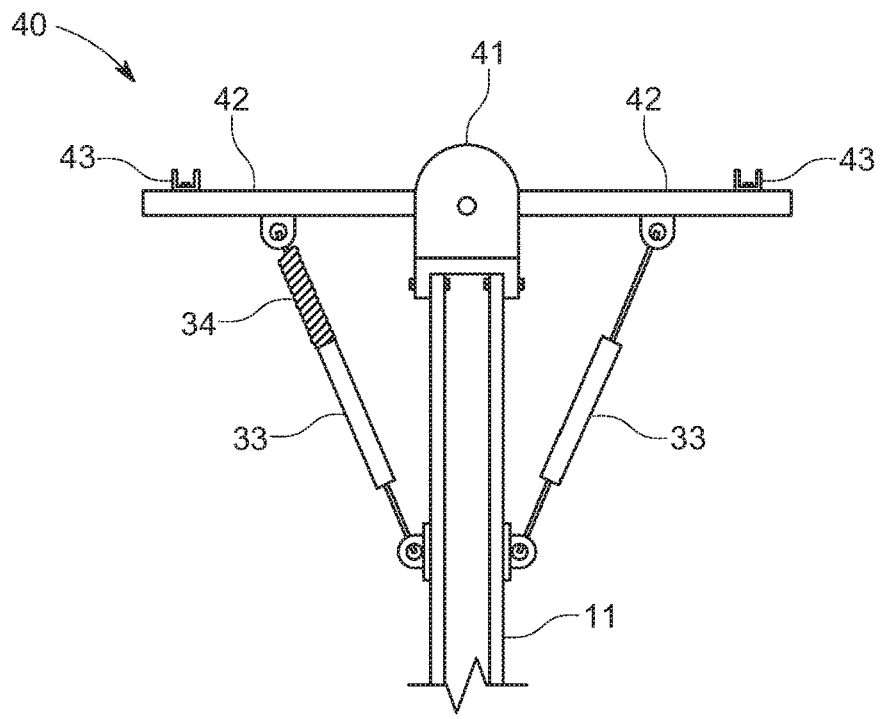
FIG. 4B is an end view of the single-axis tracker shown in 4A.

FIGS. 4A and B show yet another tracker system that relies on distributed linear actuators. System 40 is supported by multiple monopile foundations 11, however, instead of a torque tube, hinge assembly 41 is attached to the top of each pile. Hinge assembly 41 includes torque arm 42 that is centered about a pair of flanges that retain a hinge, enabling torque arm 42 to see-saw about the hinge pin in a single plane. Purlins 43 are attached to opposing end portions of torque arm 42 and together with torque arm 42 provide a frame on which to attach a single row or, in some cases, two rows of solar panels. In the case of two rows, a second set of purlins may also be attached to torque arm 42 on either side of the hinge. In such a system, simple brackets are used to clamp the solar panels onto purlins 43. Like system 30 in FIGS. 3A and 3B, linear actuators 33 are secured to the flanges on either side of each monopile 11 and are terminally connected to respective opposing ends of torque arm 42. Due to hinge assembly 41, and purlins 43, system 40 does not require a central torque tube, however, the system still enjoys the benefits of distributed moments and relatively low powered actuators at each foundation or a subset of the total number of foundations. Lateral loads are translated into the monopile foundation 11 in nearly the same way as system 30 of FIGS. 3A and B.

Figure 5A:
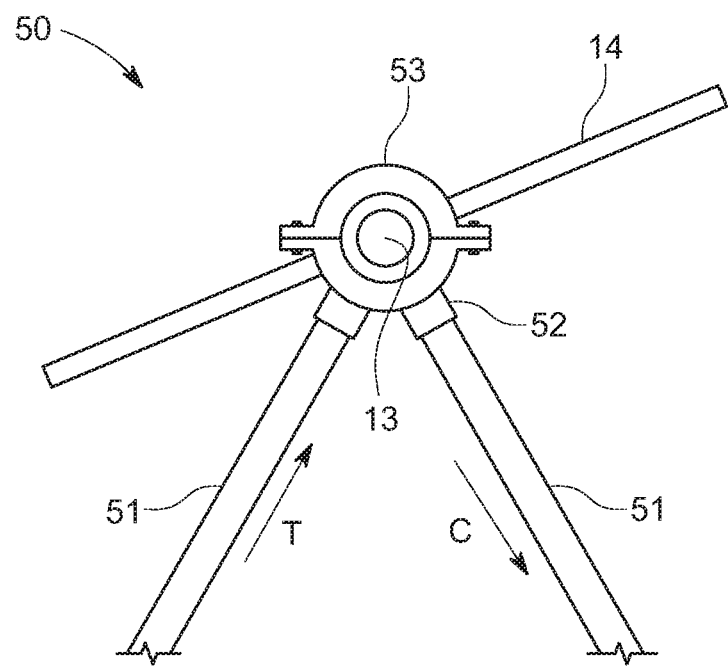
FIG. 5A is an end view of a portion of single-axis tracker and EARTH TRUSS foundation.
Figure 5B:
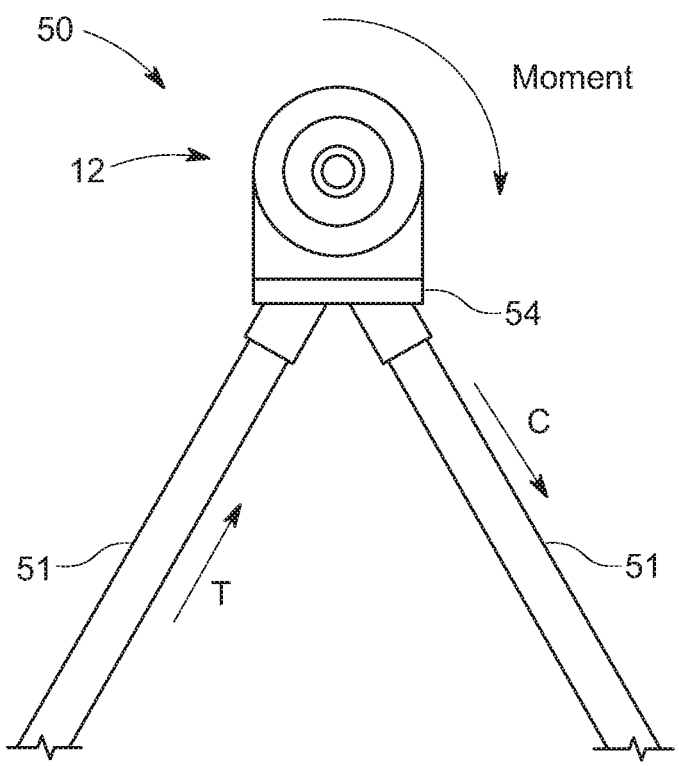
FIG. 5B is an end view of another portion of the single-axis tracker of 5A.

Turning to FIGS. 5A and B, these figures show an optimized single-axis tracker system 50 supported by an A-frame-shaped truss foundation. As mentioned above, the applicant of this disclosure has developed a unique foundation system for supporting single-axis trackers known commercially as EARTH TRUSS. As shown, it consists of a pair of adjacent legs 51 that extend below and above-ground. Legs 51 are joined with bearing adapter 52 that not only unifies the leg structures to form an A-frame-shaped truss but also provides the bearing that receives the tracker's rotating member which, in this case, is torque tube 13. Bearing cap 53 sits over bearing adapter 52 to capture torque tube 13 in place. Panels 14 are attached along the length of the torque tube via torque tube brackets (not shown). In FIG. 5A, the foundation is supporting a bearing. As mentioned above in the context of the prior art monopile foundations, moments tend to be smaller at bearing foundations relative to motor foundations unless the bearing restricts rotation. FIG. 5B shows an A-frame foundation used in system 50 to support a torque tube drive motor 12. Drive motor 12 sits on adapter 54 that connects legs 51 and provides a horizontal mounting surface to accept and support the motor. The A-frame foundation experiences moment at the motor as the motor resists lateral loads due to wind. Those moments will attempt to deform the A-frame as well as to apply tension to the windward leg and to compress the leeward one. Overall, however, the A-frame is better at dealing with lateral loads because it is able to translate them into axial forces in the legs.

Figure 6A:
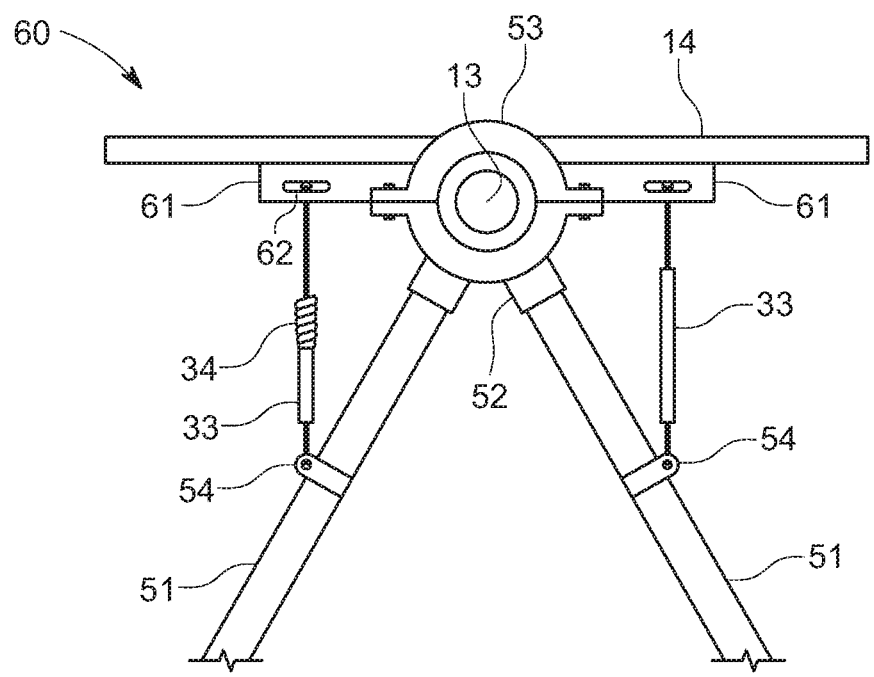
FIG. 6A is an end view of a portion of a single-axis tracker and EARTH TRUSS foundation with solar panels at a first orientation according to various embodiments of the invention.
Figure 6B:
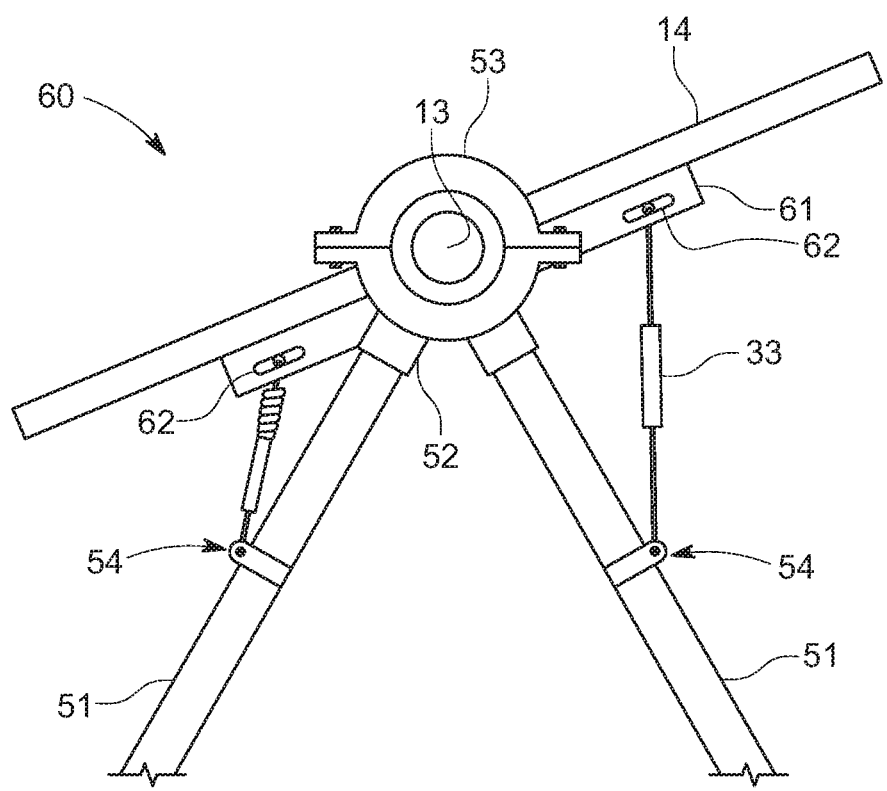
FIG. 6B is an end view of the portion of single-axis tracker shown in 6A with solar panels at a second orientation according to various embodiments of the invention.

FIGS. 6A and 6B show a tracker system 60 according to various embodiments of the invention that incorporates the benefits of distributed drive power afforded by linear actuators with the force advantages of an A-frame-shaped truss that is not possible when using monopile foundations. Exemplary system 60 is supported by the EARTH TRUSS foundation consisting of a pair of adjacent legs 51 that are joined at the top by bearing adapter 52. As in system 50 of 5A, bearing adapter 52 includes connecting portions for coupling to legs 51 as well as a bearing portion that receives torque tube 13. Torque tube 13 is captured within the bearing portion by bearing cap 53. Torque arm 61 extends away from the torque tube proximate to bearing adapter 52. Linear actuators 33 are attached to respective legs 51 via leg brackets 54. They extend upwards to respective end portions of torque arm 61. In this exemplary system, linear actuators 33 are pinned to their respective truss legs 51 at their lower end but move within slots 62 formed in torque arm 61 at their upper end. As actuators 33 extend and retract, torque arm 61 will impart torque to tube 13 causing it to rotate within the bearing.

Comparing tracker system 60 to the prior art system 30 shown in FIGS. 3A and B, although both rely on linear actuators extending from the fixed foundation to opposing ends of a torque arm, the angular alignment between the actuators and the foundation components are more favorable from a force perspective in system 60 because the actuators are oriented more in-line with each leg 51 than is possible with a monopile. In other words, the reaction force is better aligned with the force causing the moment. Therefore, as large of a section is not required to resist the moment as needed in a monopile. For example, even in the stowed or horizontal position shown in 3A, under snow loading, actuator 33 is at angled with respect to pile 11 to a much larger degree than the actuator in system 60. In system 60, at the stow position, each actuator is more closely aligned with the orientation of the foundation component (i.e., the leg) because there are two components that are spaced apart and driven at non-plumb angles. Therefore, more of the force from resisting lateral loads will be translated into axial forces of tension and compression in the legs rather than bending moments. Also, the A-frame leg geometry allows the torque tube to sweep through a larger range of angles with the same sized actuator because there is less mechanical interference than with a single plumb pile. With the plumb pile, the actuator can never go past 90-degrees because it will run into the pile. In other words, the point where the actuator becomes substantially parallel to the foundation component it is attached to limits the extent of rotation. In a monopile, this is when the actuator reaches approximately 90-degrees. Therefore, to rotate through the full range desired by tracker makers, the torque arm must be longer, and the actuator moved further outward so that by the time the extended actuator reaches near 90-degrees, the panels are at their maximum sun-angle. With an A-frame, the actuator can sweep past 90 all the way up to the angle of the leg. This may allow the panels to reach sharper angles at the beginning and end of each day with a relatively smaller actuator to harness so-called shoulder power where the sun is closer to the horizon while keeping the angle of the actuators closer to the angle of each leg.

Figure 7A:
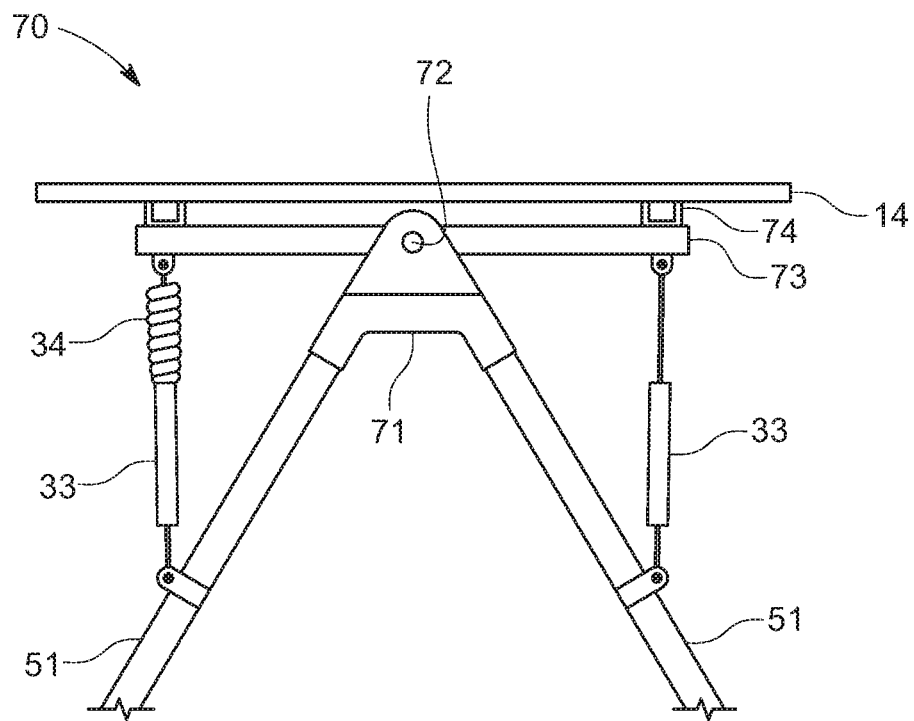
FIG. 7A is an end view of a portion of a single-axis tracker and EARTH TRUSS foundation with solar panels at a first orientation according to various embodiments of the invention.
Figure 7B:
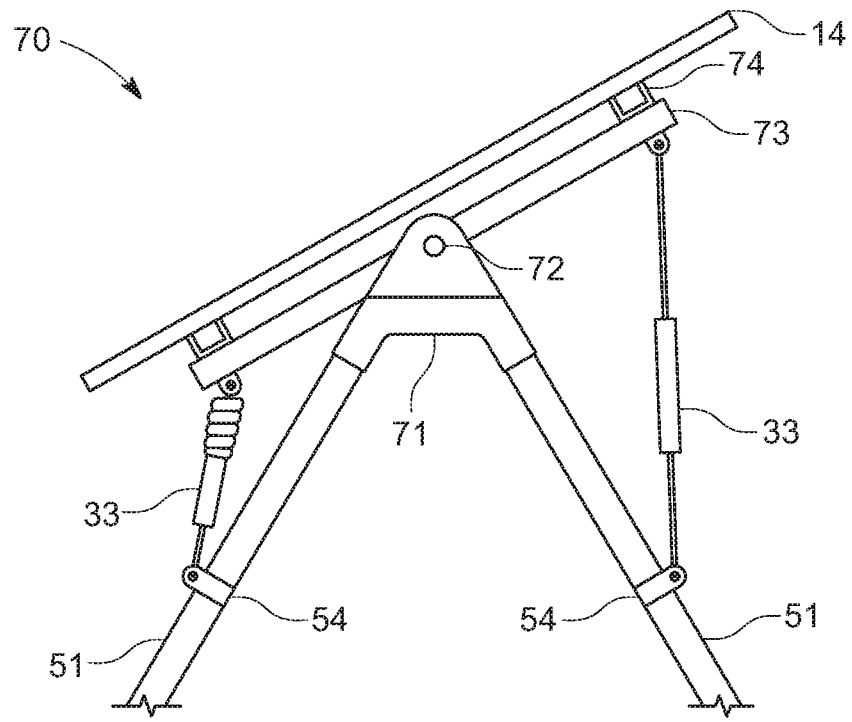
FIG. 7B is an end view of the portion of a single-axis tracker shown in 7A with solar panels at a second orientation according to various embodiments of the invention.

FIG. 7A shows another single-axis tracker supported by the EARTH TRUSS foundation according to various embodiments of the invention. System 70 shown here, like system 40 in FIGS. 4A and B does not use a torque tube. Rather, multiple A-framed-shaped EARTH TRUSS foundations are installed along a row, each consisting of adjacent legs 51 joined together with adapter 71. Hinge assembly 72 is built into or attached to adapter 71. Hinge assembly 72 includes torque arm 74 that is hinged at its midpoint so that it can see-saw about the foundation. As shown, hinge assembly 72 includes a pair of parallel flanges extending upwards away from adapter 71 that support a hinge pin oriented in the direction of the tracker row. Actuators 33 are attached to each A-frame leg 51 via leg brackets 54 and extend up to respective opposing end portions of torque arm 73. Purlins 74 are connected proximate to the ends of torque arm 73 linking the torque arm on one foundation to the torque arm on the next adjacent foundation. Purlins 43 run in the direction of the tracker row, spanning the distance between adjacent torque arms 73. In the exemplary system 40 shown here, only two purlins are used. It should be appreciated that in other embodiments, more than two purlins may be used. For example, if the tracker is supporting two rows of solar panels in portrait or landscape, it may be necessary or desirable to attach two more purlins, one on either side of the hinge, running parallel to the first set to provide support and connection points for the solar panels. Tracker system 70 achieves the same force and rotational benefits of system 60 as discussed above but without the requirement of a torque tube or bearings. In other words, it performs at least as well as monopile in the stowed position and will perform better than a monopile at large sun angles as actuators 33 become more in-line with their respective legs 51. Tracker 70 may provide savings, both up front and on an ongoing basis, relative to tracker 60 since there are no bearings or central torque tube to translate forces along the length of the array.

Figure 8:
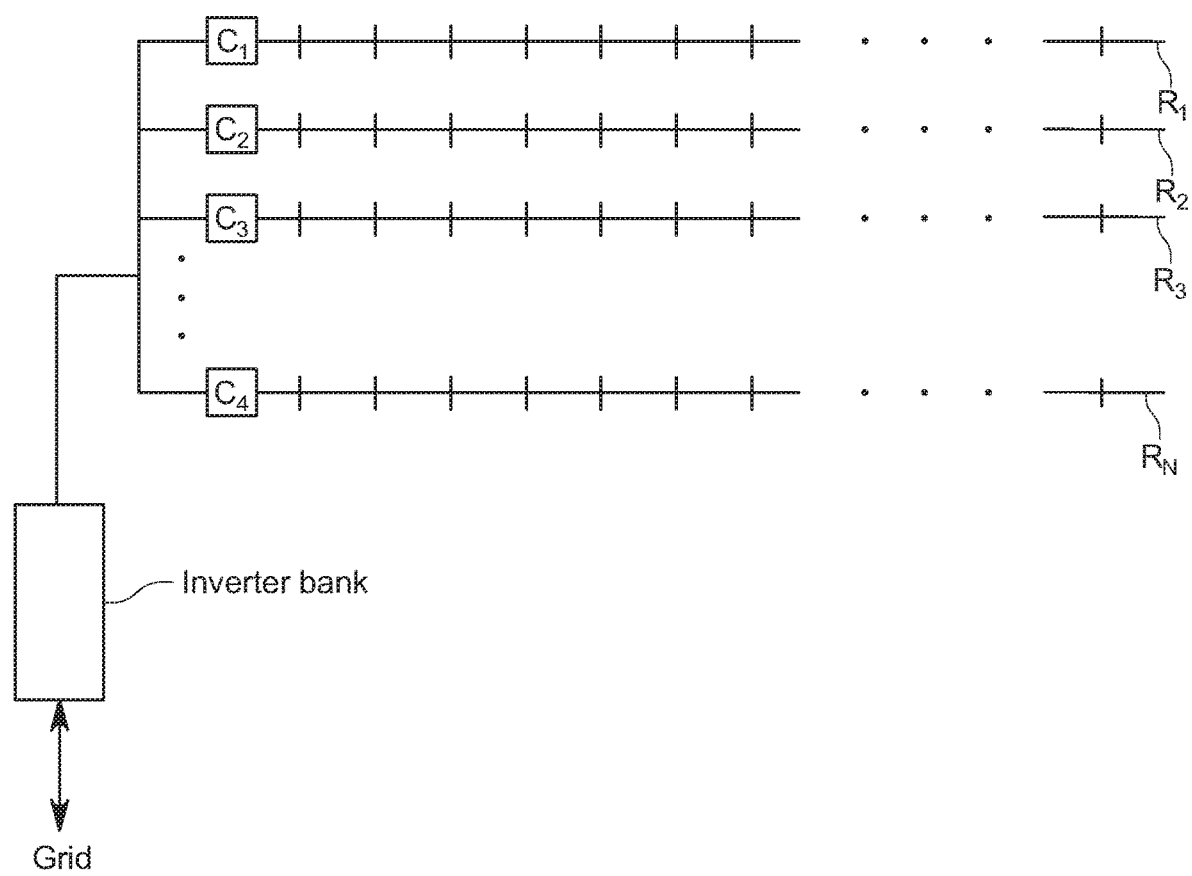
FIG. 8 is a plan view of a power and control signal layout for an exemplary single-axis tracker according to various embodiments of the invention.

Turning now to FIG. 8, this Figure is a plan diagram of power and control wiring for an exemplary tracker array according to various embodiments of the invention. As discussed herein, various embodiments rely on distributed linear actuators to rotate a torque tube or to rotate a frame about a hinge assembly rather than a single centralized motor. This requires that power be distributed across each row and down each leg containing an actuator. In various embodiments the actuators may be electrically powered. In other embodiments, they may be powered by compressed air. In still further embodiments, they may be powered by fluid, such as hydraulic fluid. To that end, FIG. 8 shows one possible layout for operating such a distributed single-axis tracker array. In this exemplary layout, power distribution lines run the length of rows $R_1$ through $R_N$. Each A-frame foundation along the row that has actuators requires power, indicated by orthogonal hatch marks along each row. A splitter will distribute power to each actuator as well as providing pass-through to the next foundation in the row. These lines may be buried or may run above ground, such as for example, underneath the solar panels, along the purlins or through the air from adapter to adapter. A control unit at the head of each row, labeled $C_1$ through $C_N$ in the figure, may control the flow of power to each individual actuator on the row. The control unit may include a general-purpose microprocessor, ASIC or other suitable control circuitry. The controller may also include an air compressor, hydraulic pump and/or transformer as well as one or more sensors to monitor for loss of pressure or electrical continuity.

The system also requires power lines that aggregate the power generated by each solar pane and route that power to an inverter bank so that it can be converted from direct current to alternating current and fed into the grid. Alternatively, the panels may have integrated inverters so that they output alternating current. The aggregated high-voltage direct current from the panels may be unsuitable to power the actuators therefore, separate electric power may be required from the grid or another source. In addition, or alternatively, each actuator may have a built-in battery that is charged when the array is generating power via one or more DC to DC transformers that lower the voltage to an acceptable level to recharge the batteries.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A tracker system comprising:
   a plurality of solar panels arranged in at least one row;
   a plurality of A-frame foundations supporting the plurality of solar panels, each A-frame foundation comprising a pair of adjacent legs angled towards each other and extending above and below ground and a bearing adapter joining above-ground ends of each pair of adjacent legs and including a bearing for receiving a torque tube;
   a plurality of linear actuators operable to selectively extend and retract in substantial unity to cause the plurality of solar panels to change orientation about a North-South axis, each linear actuator having a first end and an opposing second end, the first end of each actuator attached to a respective one of the legs; and
   a plurality of torque arms extending on either side of the torque tube proximate to the bearing adapter, wherein the second end of each actuator is connected to an end portion of one of the torque arms so that movement of each actuator applies rotational torque to the torque tube and as an angle of the solar panels with respect to horizontal becomes greater, an axis of each actuator on each A-frame foundation becomes relatively more aligned with the leg it is attached to.

2. The system according to claim 1, further comprising a bearing cap above each bearing, the bearing cap capturing the torque tube within the bearing.

3. The system according to claim 1, further comprising a controller and power source for selectively actuating the actuators in concert.

4. The system according to claim 3, wherein the power source is selected from the group consisting of electricity, compressed air, and fluid.

5. A tracker system comprising:
   a plurality of solar panels arranged in at least one row;
   a plurality of A-frame foundations supporting the plurality of solar panels, each A-frame foundation comprising a pair of adjacent legs extending above and below ground and an adapter joining above-ground ends of each pair of adjacent legs and including a bearing for receiving a torque tube;
   a plurality of actuators operable to selectively extend and retract in substantial unity to cause the plurality of solar panels to change orientation, each actuator having a first end and an opposing second end, the first end of each actuator attached to a respective one of the legs; and
   a plurality of torque arms extending on either side of the torque tube proximate to the adapter, wherein the second end of each actuator is connected to an end portion of one of the torque arms so that movement of each actuator applies rotational torque to the torque tube and as an angle of the solar panels with respect to horizontal becomes greater, an axis of each actuator on each A-frame foundation becomes relatively more aligned with the leg it is attached to.

* * * * *